US006429551B1

(12) United States Patent
Beetz et al.

(10) Patent No.: US 6,429,551 B1
(45) Date of Patent: Aug. 6, 2002

(54) OSCILLATING MOTOR

(75) Inventors: Stefan Beetz, Idar-Oberstein; Klaus Reichel, Domsuhl, both of (DE)

(73) Assignee: PNP Luftfedersysteme GmbH, Crivitz (DE)

(*) Notice: Subject to any disclaimer, the term of this patent is extended or adjusted under 35 U.S.C. 154(b) by 0 days.

(21) Appl. No.: 09/647,259

(22) PCT Filed: Mar. 17, 1999

(86) PCT No.: PCT/DE99/00742

§ 371 (c)(1), (2), (4) Date: Sep. 25, 2000

(87) PCT Pub. No.: WO99/49226

PCT Pub. Date: Sep. 30, 1999

(30) Foreign Application Priority Data

Mar. 23, 1998 (DE) ........................................ 198 12 752

(51) Int. Cl.[7] ........................... H02K 33/00; F01C 9/00
(52) U.S. Cl. ........................... 310/36; 277/407; 92/125
(58) Field of Search ............................ 310/36, 37, 38, 310/39; 277/407; 92/120, 121, 122, 123, 124, 125

(56) References Cited

U.S. PATENT DOCUMENTS 3,128,679 A 4/1964 Trendle ...................... 92/13.5
3,195,421 A 7/1965 Rumsey et al. ............... 92/122
3,426,654 A 2/1969 Laughman ................... 92/125
6,181,034 B1 * 1/2001 Reichel et al. ................ 310/36
6,184,598 B1 * 2/2001 Reichel et al. ................ 310/36

FOREIGN PATENT DOCUMENTS

DE 4333047 10/1994

* cited by examiner

*Primary Examiner*—Nestor Ramirez
*Assistant Examiner*—Judson H. Jones
(74) *Attorney, Agent, or Firm*—Horst M. Kasper

(57) ABSTRACT

Known oscillating motors have inter alia starting difficulties resulting from the fact that the sliding seal ring is subject to pressures applied within said ring, even at a standstill. According to the invention, an oscillating motor is provided, comprising a sliding seal ring capable of axially sliding on a journal (8) of the output shaft (7) and which rests on an internal surface of the cover (4) with a sliding and sealing surface. Annular rings which are located on the cover side of the sliding seal ring (23) are connected through pressure compensation bores (34) and pressure compensation channels (38) to the side of the sliding seal ring (23) oriented towards the pressure chamber (13) or the discharge chamber (14). Static pressure in the housing (27) of the diagonal seal ring (28) and dynamic pressure in the pressure chambers (13) can thus be compensated.

7 Claims, 4 Drawing Sheets

OSCILLATING MOTOR

Figure 1:
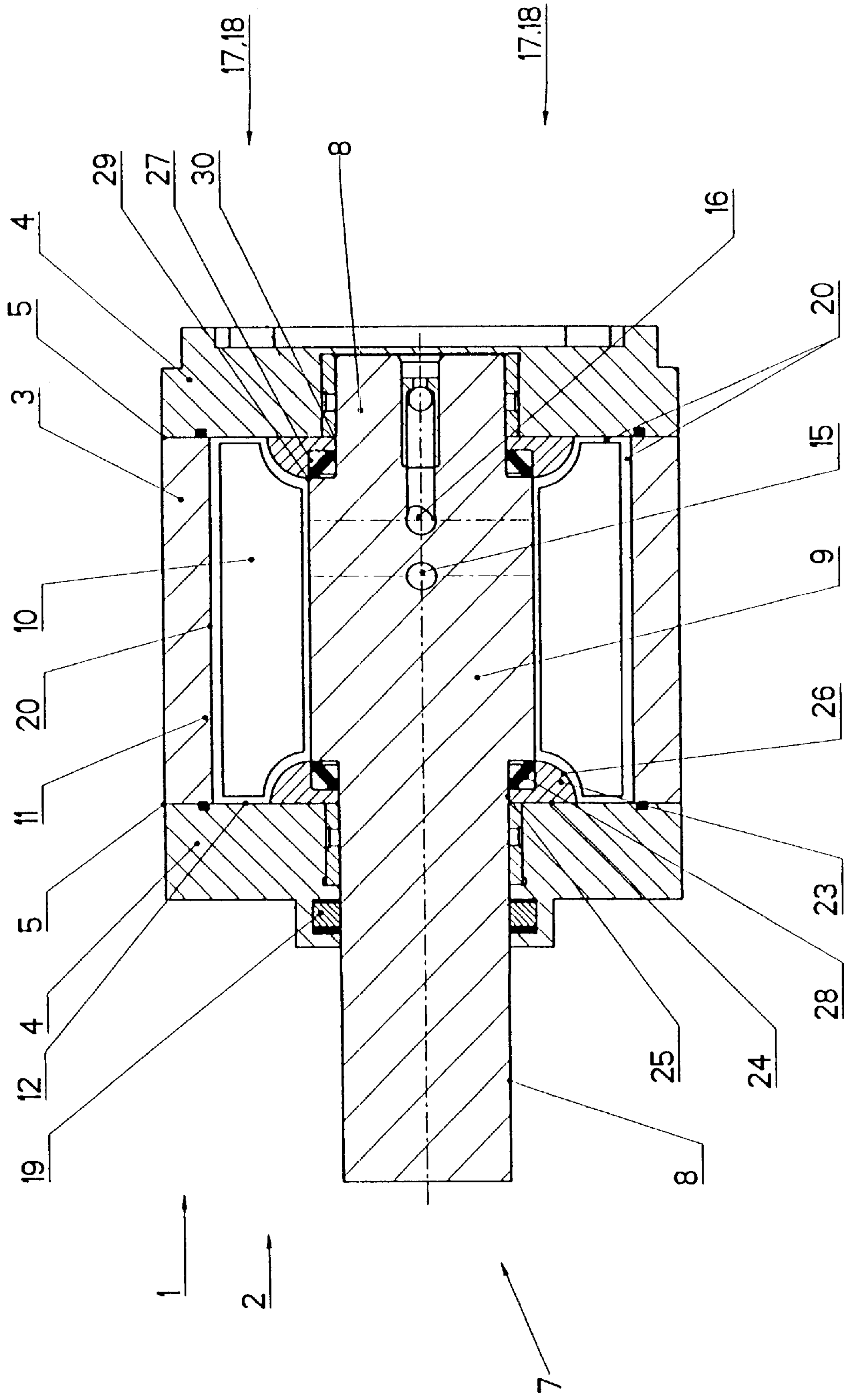

The present invention relates to an oscillating motor according to the preamble of claim 1.

Such oscillating motors are employed in particular in aircraft and motor vehicle industries.

Such oscillating motor comprises a stator with a casing and covers on two sides. One or several stator wings are disposed in the casing. A driven shaft is supported in the covers, wherein the driven shafts are equipped with rotor wings in equal numbers. The stator wings and the rotor wings form several volume changeable chambers, which are formed as pressure chambers or, respectively, discharge chambers and which are correspondingly furnished with a connection to the corresponding feed port or, respectively, discharge port. The pressure chamber and the discharge chambers are separated from each other by in each case one frame sealing element surrounding the stator wing or, respectively, the rotor wing. In each case a ring shaped sealing element is disposed in the region of the driven axis between the rotor and each cover and preferably in the cover for sealing against the outside.

Oscillating motors of this kind are subject to large sealing problems, which are expressed in a very high wear of the sealing elements and in an unsatisfactory sealing quality in the region of the driven shaft not at last because of the limited and alternating rotary motion.

Already many attempts have been undertaken for resolving this problem. For example it is known to employ a flexible diagonal sealing ring, wherein the flexible diagonal sealing ring is inserted into an anullar groove of the cover and is aligned with its diagonal sealing edge opposite to the pressure direction onto the circulating sealing slot between the front faces of the cover and the rotor wing. Pressure medium passes into the hollow space of the diagonal sealing ring through this sealing slot during operation, wherein a pressure equal to the pressure in the pressure chamber builds up in the hollow space of the diagonal sealing ring, wherein the pressure presses the flexible diagonal sealing ring with its sealing edge against the circulating sealing slot based on different face ratios and closes the circulating sealing slot. This sealing variation, however, is associated with substantial disadvantages. A very high wear occurs at the diagonal sealing ring, since the resting diagonal sealing ring is subjected to different pressure loads and is pressed continuously against the rotor moving in alternating directions. This leads because of the high load to a small lifetime of the diagonal sealing rings and thus to an increase in expense of the oscillating motor. A further disadvantage comprises that the enclosed pressure remains present in the hollow spaces of the diagonal sealing ring even in case of a pressureless pressure chamber. A still higher friction force occurs relative to the operating state in the resting state based on the different pressure situations, wherein the still larger friction force has to be overcome always with each starting up of operations. This again contributes to a decrease in the lifetime and furthermore limits seriously the application field of such oscillating motors because of the bad starting behavior.

It is also known to employ a sliding sealing ring in the cover instead of the diagonal sealing ring, wherein the sliding sealing ring rests against the rotating front faces of the rotor wings and thus at the sealing element of the box. The frame sealing element is severely loaded by an unintended but always possible relative motion between the sliding sealing ring and the frame sealing element at the rotor wing, which is associated with a short lifetime. In addition, the sealing values are extremely low under use of the sliding sealing ring, which decreases the degree of effectiveness of the oscillating motor. The possibilities of employment of this oscillating motor are substantially limited based on the small degree of effectiveness and the small lifetime duration of the anullar sealing elements.

It also became known from the U.S. Pat. No. 3,426,654 to employ a diagonally acting sealing element, which is loaded by a flexible sealing ring in sealing direction and is supported in its sealing function by the flexible sealing ring. Finally also this sealing variant cannot do justice to the high requirements with respect to the start-up behavior, the sealing effectiveness and the lifetime.

Therefore it is an object, to improve the start-up behavior in case of radial oscillating motors of the present kind and to maintain the high standard in the sealing function and the lifetime in this situation.

This object is accomplished with the characterizing features of claim 1. Useful embodiments result from the subclaims 2 through 7.

The invention eliminates the recited disadvantages from the state of the art. In particular the start-up behavior of the oscillating motor is thereby improved such that the static pressure enclosed in the incorporation chamber of the diagonal sealing ring and the dynamic work pressure present in the pressure chambers can be balanced through pressure balancing channels to both sides of the sliding sealing ring. This reduces the undesired press-on forces operating during resting and during working of the oscillating motor by an advantageous order of magnitude. It is here of advantage to balance both the static pressure from the incorporation chamber of the diagonal sealing ring as well as the dynamic pressure part of the pressure chambers at the sliding sealing ring. It is assured with the locking piston or securing means against rotation between the rotor and the sliding sealing ring such that the sliding sealing ring performs a relative motion to neither sealing element nor to the frame sealing element nor to the diagonal sealing ring. Here a static sealing position is realized, which is characterized by a high capability of sealing. This static sealing position means in addition, however, a very gentle treatment of the concerned sealing elements, which results in a high lifetime. It is a particular advantage if separated anullar channels are furnished for the dynamic pressure balance and for the static pressure balance. This allows an always constant press-on force at the sliding sealing ring.

The invention is to be illustrated in more details by way of an example embodiment in the following.

There is shown for this purpose

Figure 2:
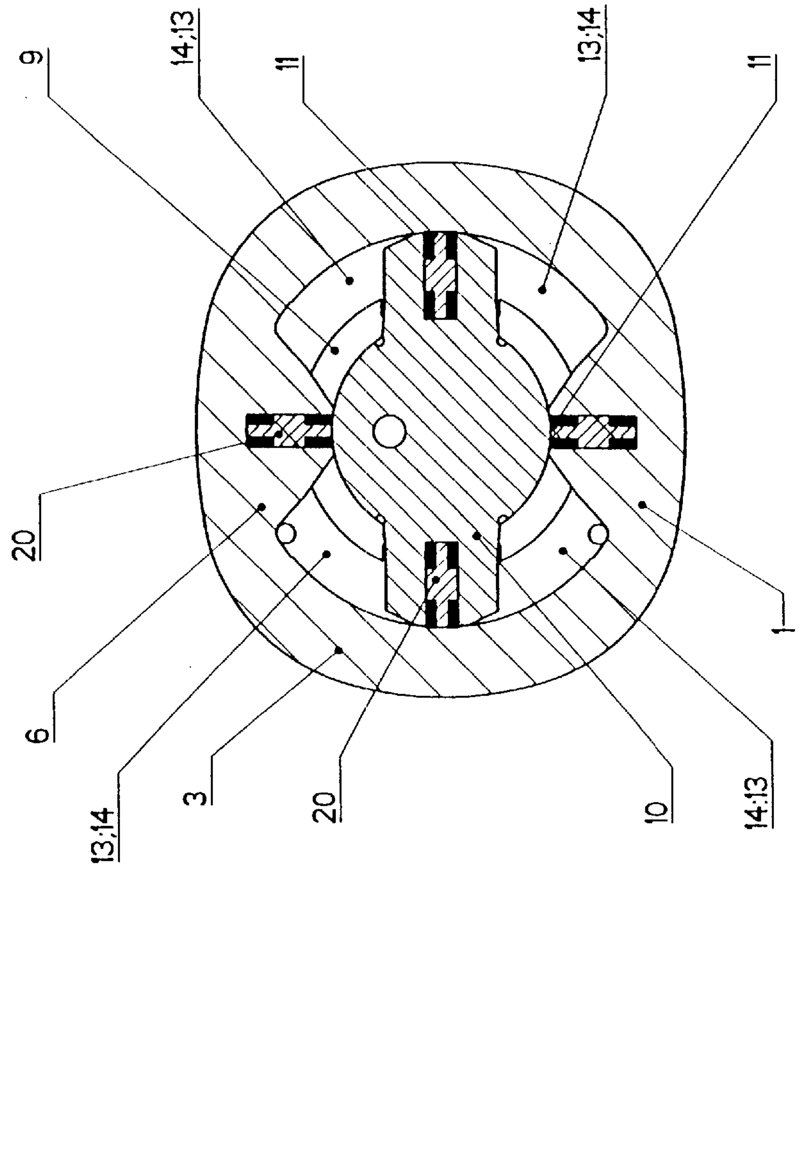

FIG. 1: an oscillating motor in a longitudinal sectional view,

FIG. 2: the oscillating motor in a cross section

Figure 3:
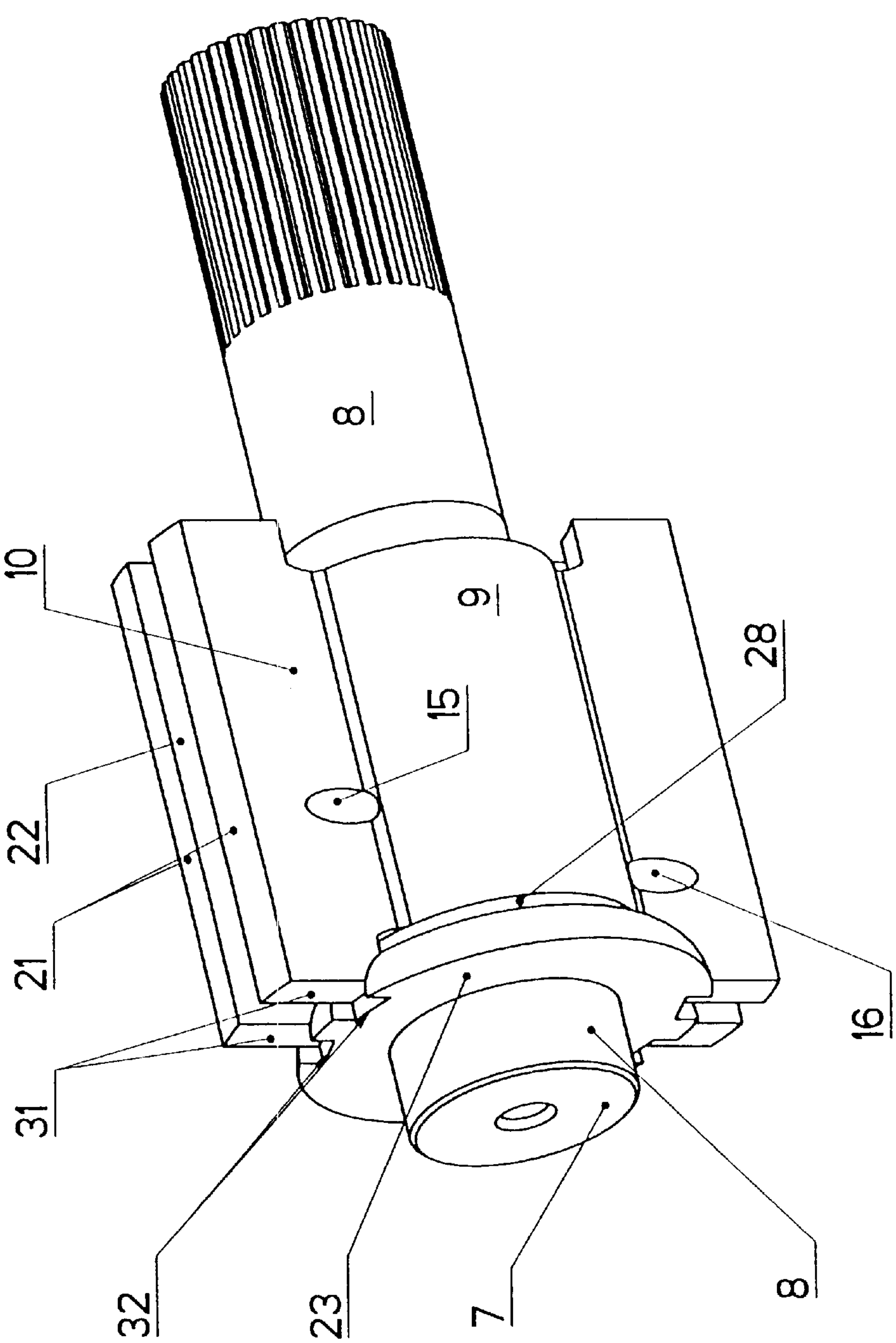
Figure 4:
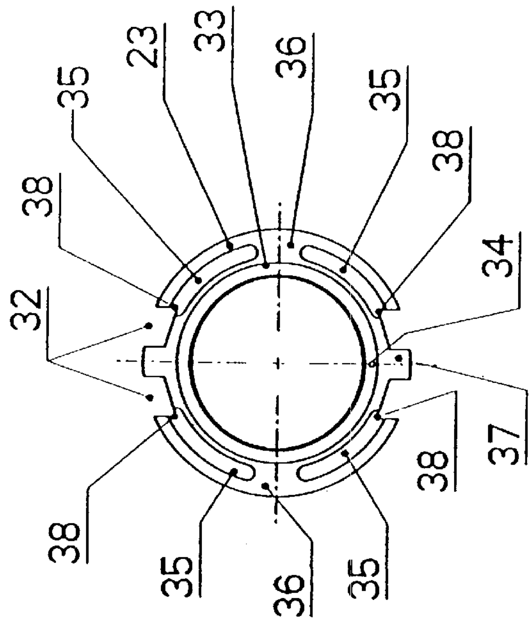

FIG. 3: the rotor of the oscillating motor in a perspective view,

FIG. 4: the sliding sealing ring in a front elevational view, and

Figure 5B:
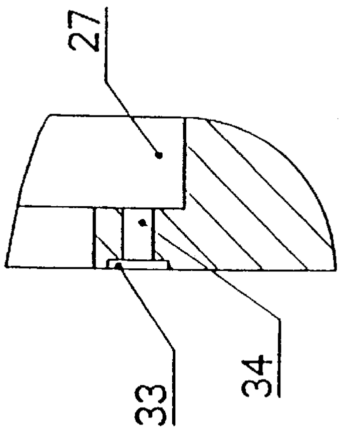
Figure 5A:
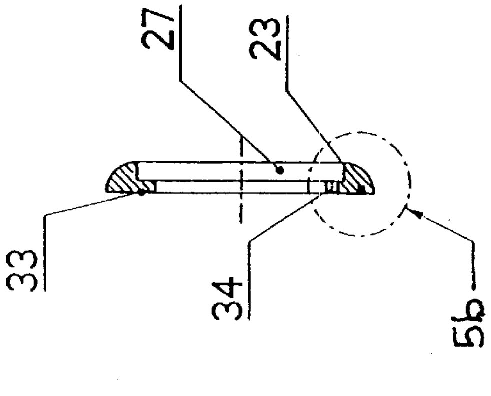

FIGS. 5*a* and 5*b:* the sliding sealing ring in a partially sectional view.

The oscillating motor according to FIG. 1 comprises mainly an outer stator 1 and an inner rotor 2. The stator 1 comprises a casing 3 and covers 4 disposed at the two front side of the casing 3, which covers are attached by screws not illustrated. A straining ring 5 at each cover side accepts the fixing of the radial positions relative to each other. The two covers 4 are furnished each with a bearing bore hole. A cylindrical casing bore hole is disposed in the interior of the casing 3, wherein the cylindrical casing bore hole is subdivided along the length of the cylindrical casing bore hole by two opposite to each other disposed and radially directed and aligned stator wings 6 into two opposite free spaces. The rotor 2 comprises in contrast a driven shaft 7 with bearing pins 8 on two sides and with an intermediately disposed cylinder part 9. Two oppositely disposed and radially aligned rotor wings 10 are disposed in the region of this cylinder part 9. The rotor 2 is adapted such in the casing 3 of the stator 1, that between the head of the rotor wing 10 and the inner wall of the casing as well as between the head of the stator wing 6 and the circumference of the face of the cylinder part 9 there is formed in each case an axially aligned sealing slot 11.

In each case the radially aligned sealing slot 12 results between the front faces of the rotor wings 10 and the front faces of the stator wing 6 and the two sided inner faces of the two covers 4. Each rotor wing 10 therefore subdivides one of the two free spaces in the casing 3 into a pressure space 13 and a discharge space 14, such that two oppositely disposed pressure chambers 13 and two oppositely disposed discharge chambers 14 result, which reverse themselves during operation. The two pressure chambers 13 and the two discharge chambers 14 are connected to each other by internal channels 15 or respectively 16, while one of the two pressure chambers 13 is in connection with a feed connector 17 and one of the two discharge chambers 14 is in connection with a discharge port 18. Sealing elements 19 are furnished in the usual way for the external sealing between the covers 4 and the respective bearing pins 8 as well as between the covers 4 and the casing 3.

A frame sealing element 20 is disposed in the region of the axial and the radially directed sealing slot 11 and 12 on each of the rotor wings 10 and on each stator wing 6 for assuring the internal sealing between the neighboring pressure chambers 13 and the discharge chambers 14. For this purpose each stator wing 6 and each rotor wing 10 is furnished with the two longitudinal running arms 21, which form a groove 22 between themselves in the middle and over the full height and the full length extending. The frame sealing element 20 is pressed into this groove 22. This assures that the rotor wing 10 is sealed off at the circumference and at the front faces of each rotor wing 10 relative to the casing 3 and the covers 4.

A sliding sealing ring 23 is placed axially slidable onto the driven shaft 7 in the transition region from the bearing pin 8 to this cylinder part 9 such that the sliding sealing ring 23 rests with its radially directed sliding and sealing face in a sliding way at the inner face of the cover 4 and forms here a radially directed sealing slot 24. The sliding sealing 23 rests with its axially directed sealing face at the circumference of face of the drive shaft 7 and forms here an axially directed sealing slot 25. A further sealing slot 26, which in each case separates neighboring pressure chambers and discharge chambers 13, 14 and which is sealingly closed by the frame sealing element 20, is present ween the inner disposed face of the sliding sealing ring and the rotor or, respectively stator wing 10 or, respectively, 6.

The sliding sealing ring 23 is furnished on its side disposed remote relative to the cover 4 with a recess, wherein the recess is furnished as an incorporation chamber 27 for diagonal sealing ring 28. This incorporation chamber 27 forms a first sealing edge 29 and a second sealing edge 30 in cooperation with the diameter step at the cylinder part 9 of the driven shaft 7. The diagonal sealing ring 28 is for example formed with the two sealing parts and in intermediately disposed and movable guide part and the diagonal sealing ring 28 is adapted such into the incorporation chamber 27 that the one sealing part on the one hand rests at the first sealing edge 29 and the other sealing part on the other hand rests at the second sealing edge 30.

The sliding sealing ring 23 and the rotor 2 are further equipped with a locking piston or rotary securing means as shown in particular in FIG. 3. For this purpose in each case the two arms 21 of the rotor wing 10, which enclose the frame sealing element 20, are formed as catch dog 31 at their front sides. In contrast the sliding sealing ring 23 is furnished with the two oppositely disposed pairs of axial grooves 32 at the circumference, wherein each pair of grooves 32 is coordinated to the two arms 21 of one of the rotor wings 10. In this way the distance of the two grooves 32 of a pair at the sliding sealing ring 23 corresponds to the distance of the two catch dogs 31 at the arms 21 of the rotor wing 10. Similarly the dimensions of each axial groove 32 correspond to the dimensions of the corresponding oppositely disposed catch dog 31, such that each catch dog 31 engages into an axial groove 32 in the mounted state. The sliding sealing ring 23 is furthermore equipped with devices for a static pressure relief and for dynamic pressure relief in order to reduce the friction resistances between the sliding sealing ring 23 and the cover 4.

For this purpose the sliding sealing ring 23 is furnished with a circulating anullar channel 33 on the cover side for a static pressure relief, wherein the circulating anullar channel 33 is tuned in its position and its effective base face to the position and the size of the pressure loaded base face of the incorporation chamber 27 on the pressure side for the diagonal sealing ring 28. At least one pressure balancing bore hole 34 connects the anullar channel 33 on the cover side to the pressure side incorporation chamber 27 of the diagonal sealing ring 28.

Four anullar channels 35 are furnished for the dynamic pressure balancing again on the cover side of the sliding sealing ring 23, wherein the four anullar channels 35 are disposed on a common circumference line and are limited in their length. Here always two neighboring anullar channels 35, on the one hand are separated from each other by a web 36 and on the other hand by the two grooves 32 with the intermediately disposed groove web 37. Each of the four anullar channels 35 runs out in one of the two grooves 32 and thus creates a pressure balancing channel 38 between all four anullar channels 35 and the pressure chamber 13. The four anullar channels 35 are directed in their position oppositely disposed to the pressure effective face of the sliding sealing ring 23. The size of the effective base face corresponds to a predetermined part of the pressure effective face of the sliding sealing ring 23. Always two oppositely disposed anullar channels 35 are connected to the two oppositely disposed pressure chambers 13 of the oscillating motor by this arrangement, while the webs 36 and the groove webs disposed between the grooves 32 separate the pressure chambers 13 from the neighboring discharge chambers 14.

Pressure medium passes as leakage from the two oppositely disposed pressure chambers 13 in each case through a first sealing edge 29 into the incorporation chamber 27 of the diagonal sealing ring 28 during the operation of the oscillating motor and the pressure medium builds here the same pressure as in the pressure chambers 13, because the flow of the pressure medium is interrupted by the second sealing edge 30. Instead pressure medium, however, passes through the pressure balancing bore hole 34 into the oppositely disposed anullar channel 33, thereby a pressure balancing occurs to the two sides of the diagonal sealing ring 23 and thus to a decrease in the press-on force operating in the direction of the cover 4. The pressure is enclosed in the incorporation chamber 27 and in the anullar channel 33 and thereby operates statically onto the sliding sealing ring 23.

At the same time the pressure in the two pressure chambers 13 loads the sliding sealing ring 23 on its part faces protruding into the pressure chambers 13 also in the direction of the cover 4. The pressure propagates however also through the pressure balancing charts 38 to the two oppositely disposed anullar channels 35 and loads the sliding sealing ring 23 in opposite direction. The force resulting therefrom remains as a press-on force for the assurance of the sealing functions of the sliding sealing ring 23. The sliding sealing ring 23 is dynamically loaded in this region based on the alternating pressure situations in the pressure chambers 13.

List of Reference Numerals

1 stator
2 rotor
3 casing
4 cover
5 straining ring
6 stator wing
7 driven shaft
8 bearing pin
9 cylinder part
10 rotor wing
11 sealing slot
12 sealing slot
13 pressure chamber
14 discharge chamber
15 channel
16 channel
17 feed port
18 discharge port
19 outer sealing element
20 frame sealing element
21 arm
22 groove
23 sliding sealing ring
24 sealing slot
25 sealing slot
26 sealing slot
27 incorporation chamber
28 diagonal sealing ring
29 first sealing edge
30 second sealing edge
31 catch dog
32 axial groove
33 anullar channel
34 pressure balancing bore hole
35 anullar channel
36 web
37 groove web
38 pressure balancing channel

What is claimed is:

1. Oscillating motor comprising a stator (1) with a casing (3) and covers (4) disposed on two sides, wherein at least one stator wing (6) is disposed in the casing (3), and a rotor (2) with a driven shaft (7) supported in one of the covers (4) and with a number of rotor wings (10) corresponding to the number of stator wings (6), wherein the stator wing (6) and the rotor wing (10) in connection with the casing (3), with a cylinder part (9) of the driven shaft (7) and with the two covers (4) form at least one pressure chamber (13) and one discharge chamber (14), and wherein the pressure chamber (13) and the discharge chamber (14) are sealed inwardly by a frame sealing element (20) inserted into the stator wing and inserted into the rotor wing (10,6), and the pressure chamber (13) and the discharge chamber (14) are sealed outwardly and inwardly by an anullar sealing element, wherein the anullar sealing element comprises the sliding sealing ring (23) and a soft sealing ring disposed on the side of the pressure chamber (13) and of the discharge chamber (14) and wherein the sliding sealing ring (23) and the soft sealing ring are disposed on a common axis, characterized in that the sliding sealing ring (23) is disposed axially shiftable on a bearing pin (8) of the driven shaft (7) and rests at the inner face of the cover (4) with a sliding and sealing face and wherein anullar channels (33, 35) are disposed on the cover side of the sliding sealing ring (23), wherein the anullar channels (33, 35) are connected to the side of the sliding sealing ring (23) disposed toward the pressure chamber (13) or, respectively, the discharge chamber (14) through pressure balancing bore holes (34) and pressure balancing channels (38).

2. Oscillating motor according to claim 1 characterized in that an incorporation chamber (27) of the soft sealing ring and disposed in the sliding sealing ring (23) is connected to a cover side circulating anullar channel (33) through at least one pressure balancing bore hole (34) in the sliding sealing ring (23) and/or each pressure chamber (13) and discharge chamber (14) to the cover side further anullar channel (35) through at least one pressure balancing channel (38) in the sliding sealing ring (23).

3. Oscillating motor according to claim 2 characterized in that further anullar channel (35) comprises four length limited regions, wherein the length limited regions in each case are disposed on a common circumferential line and are limited on the one hand by a web (36) and on the other hand by a groove web (37).

4. Oscillating motor according to claim 3 characterized in that the rotor (2) and the sliding sealing ring (23) are furnished with a locking piston or rotary securing means, wherein the locking piston or rotary securing means comprises at least one catch dog (31) at each one of the rotor wings (10) and at least an axial groove (32) disposed in the sliding sealing ring (23) and corresponding to the catch dog (31) and wherein each groove (32) is furnished with a pressure balancing channel (38).

5. Oscillating motor according to claim 4 characterized in that the axial grooves (32) are disposed pairwise in the sliding sealing ring (23) and are in each case coordinated to the arms (21) of the rotor wing (10), wherein the catch dogs (31) are formed at the front faces of the arms (21).

6. Oscillating motor according to claim 3 characterized in that a circulating anullar channel (33) is furnished for the static pressure balancing and the four length limited regions of the further anullar channels (35) are furnished for the dynamic pressure balancing.

7. Oscillating motor according to claim 1 characterized in that the soft sealing ring is a diagonal sealing ring (28), wherein the soft sealing ring is fitted into an incorporation chamber (27) of the sliding sealing ring (23) and wherein the diagonal sealing ring (28) is aligned with its sealing parts in opposite direction to a first sealing edge (29) formed at the cylinder part (9) of the driven shaft (7) and to a second sealing edge (30) disposed at the bearing pin (8).

* * * * *